United States Patent
Wakabayashi et al.

(10) Patent No.: US 11,719,033 B2
(45) Date of Patent: Aug. 8, 2023

(54) VEHICLE WINDOW GLASS WITH CLAMPING MEMBER

(71) Applicant: AGC Inc., Tokyo (JP)

(72) Inventors: Ryusuke Wakabayashi, Tokyo (JP); Takafumi Inoue, Tokyo (JP)

(73) Assignee: AGC INC., Tokyo (JP)

( * ) Notice: Subject to any disclaimer, the term of this patent is extended or adjusted under 35 U.S.C. 154(b) by 48 days.

(21) Appl. No.: 17/540,767

(22) Filed: Dec. 2, 2021

(65) Prior Publication Data
US 2022/0185078 A1    Jun. 16, 2022

(30) Foreign Application Priority Data
Dec. 14, 2020   (JP) .................. 2020-206525

(51) Int. Cl.
*E05F 11/38*   (2006.01)
*B60J 1/17*    (2006.01)
*B60J 1/00*    (2006.01)

(52) U.S. Cl.
CPC ............ *E05F 11/385* (2013.01); *B60J 1/006* (2013.01); *B60J 1/17* (2013.01)

(58) Field of Classification Search
CPC .. B60J 1/006; B60J 1/17; E05F 11/385; E05F 15/689; E05F 11/445
USPC .......................................... 296/146.2; 49/375
See application file for complete search history.

(56) References Cited

U.S. PATENT DOCUMENTS

| | | | | |
|---|---|---|---|---|
| 4,026,088 A | * | 5/1977 | Akabane | E05F 11/445 52/716.5 |
| 5,513,468 A | * | 5/1996 | Diestelmeier | E05F 11/445 49/351 |
| 5,987,820 A | * | 11/1999 | Shibanushi | E05F 11/385 49/358 |
| 6,170,197 B1 | | 1/2001 | Tyves et al. | |
| 6,349,504 B1 | * | 2/2002 | Schmitt | E05F 11/385 52/127.3 |
| 6,588,152 B2 | * | 7/2003 | Cabbane | E05F 11/385 49/374 |
| 8,209,908 B2 | * | 7/2012 | Mori | E05F 11/385 49/374 |
| 9,032,669 B1 | * | 5/2015 | Phillips | B60J 1/17 49/502 |
| 9,970,226 B2 | * | 5/2018 | Stewart | B60J 1/006 |
| 2013/0050797 A1 | * | 2/2013 | Takahashi | B60J 1/17 359/245 |
| 2017/0284140 A1 | | 10/2017 | Sase | |
| 2017/0306677 A1 | * | 10/2017 | Kosaka | E05D 15/466 |

FOREIGN PATENT DOCUMENTS

| | | |
|---|---|---|
| JP | 5071075 B2 | 11/2012 |
| JP | 2017-094880 A | 6/2017 |
| JP | 6610900 B2 | 11/2019 |

* cited by examiner

*Primary Examiner* — Jason S Morrow
(74) *Attorney, Agent, or Firm* — Foley & Lardner LLP

(57) ABSTRACT

A first side wall portion forming a body portion of a clamping member includes first convex members projecting toward a second side wall portion and being softer than the first side wall portion. The first convex members are disposed at positions of the first side wall portion adjacent to respective ends of the first side wall portion in an X axial direction (third direction).

7 Claims, 9 Drawing Sheets

VEHICLE WINDOW GLASS WITH CLAMPING MEMBER

The resent invention relates to a vehicle window glass with a clamping member.

BACKGROUND ART

A vehicle window glass that is attached to a vehicle door so as to be slidable up and down is moved up and down by a driving force of a lifting device (also called "regulator") disposed in the door panel of the door.

For example, the automobile window glass disclosed in Patent Document 1 listed below has holders (also called "channels") attached to portions of a lower edge portion thereof, and the holders are coupled to a regulator via supporting members. In Description, a "holder" and a "channel" are collectively called a "clamping member".

Each of the holders includes a body portion and a holding portion integrally attached to an upper end of the body portion. The holders are made of a metal, a resin material or the like. Each of the holding portions includes a pair of holding plates disposed so as to be apart from each other, and a lower edge portion of an automobile window glass is placed between the paired holding plates and fixed therebetween by an adhesive or the like.

PRIOR ART DOCUMENTS

Patent Documents

Patent Document 1: JP-A-2017-94880

DISCLOSURE OF INVENTION

Technical Problem

In the conventional vehicle window glasses with clamping members, when the clamping members are attached to a vehicle window glass, the following problems are caused because the clamping members hold the vehicle window glass, being wholly flexed.

Specifically, regarding the clamping members, a clamping member could deteriorate, at an earlier stage, due to a residual stress generated therein since the clamping members are disposed in a vehicle, being flexed.

Regarding the vehicle window glass, the vehicle window glass is subjected to a residual stress generated by attachment of the clamping members. When the vehicle window glass is made of tempered glass having a compressive stress layer generated in a surface, the vehicle window glass is trouble-free in terms of durability. In contrast, when the vehicle window glass is made of a laminated glass made of non-tempered glass having a lower allowable stress than the tempered glass, the vehicle window glass is not trouble-free in terms of durability.

In recent years, the types of vehicles have been increasing in which a laminated glass is applied even to vehicle door windows allowing the windows to slide up and down. In such vehicle types, it is necessary to reduce the residual stress in the laminated glass generated by attachment of the clamping members. The current proposals are insufficient, leaving the problem of durability unresolved.

As described above, the conventional vehicle window glasses are problematic in terms of durability. In particular, when a laminated glass is applied to the vehicle window glasses, the laminated glass per se is problematic in terms of durability.

The present invention is proposed in consideration of such circumstances. It is an object of the present invention to provide a vehicle window glass with a clamping member, which is highly durable even when a laminated glass is applied to the vehicle window glass.

Solution to Problem

In order to attain the object, in one mode of the present invention, there is proposed a vehicle window glass with a clamping member, which is configured to attached to a vehicle door so as to be slidable up and down, and which includes a laminated glass, the laminated glass comprising an exterior side glass plate and an interior side glass plate, and the exterior side glass plate and the interior side glass plate being bonded via an interlayer; and a clamping member, the clamping member attached to a lower side of the laminated glass and holding an edge portion of the laminated glass; wherein the clamping member includes a bottom portion; a first side wall portion, the first side wall portion extending from the bottom portion in a first direction perpendicular to the bottom portion; a second side wall portion, the second side wall portion being spaced from the first side wall in a second direction perpendicular to the first direction, the second side wall portion extending from the bottom portion in the first direction and being opposite to the first side wall portion;

wherein the first wall portion includes first convex members projecting toward the second side wall portion, the first convex members being softer than the first side wall portion; and wherein the first convex members are disposed at portions of the first side wall portion adjacent to respective ends of the first side wall portion in a third direction perpendicular to the first direction and the second direction.

Advantageous Effects of Invention

In accordance with the one mode, when a laminated glass is applied to a vehicle window glass with a clamping member, it is possible to reduce a residual stress generated in the clamping member and the laminated glass having the clamping member attached thereto such that the vehicle window glass has high durability.

DESCRIPTION OF EMBODIMENTS

Now, the vehicle window glass with a clamping member according to an embodiment of the present invention will be described in detail in reference to the accompanying drawings.

In Description, the wordings of "upward", "downward", "interior", "exterior", "vehicle width", "forward" and "rearward", which are indicative of directions or positions, mean "upward", "downward", "interior", "exterior", "vehicle width", "forward" and "rearward" when the vehicle window glass with a clamping member is mounted to a vehicle.

Figure 1:
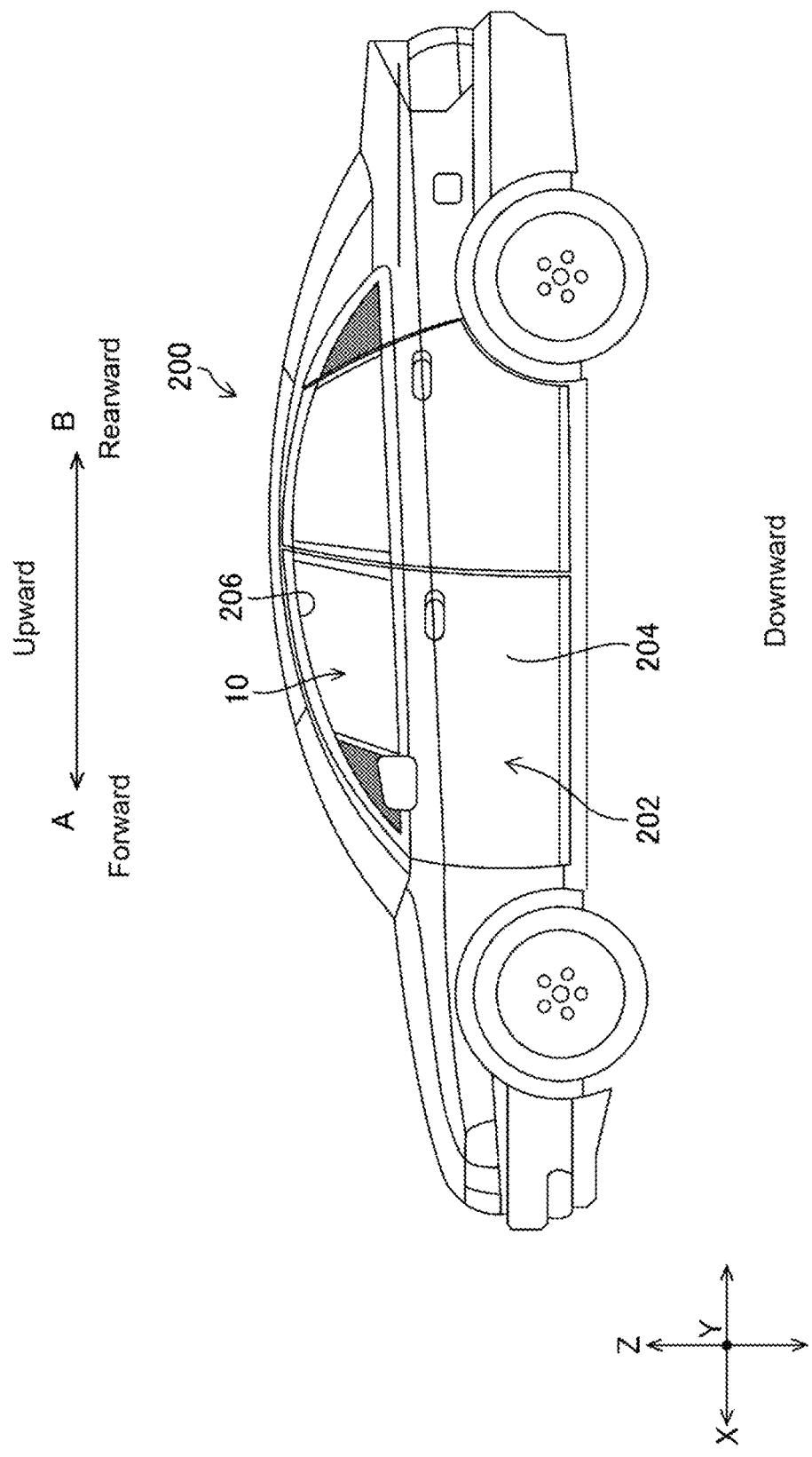
FIG. 1 is a right side view of essential parts of a vehicle where the vehicle window glass with a clamping member according to an embodiment of the present invention is mounted.
Figure 2:
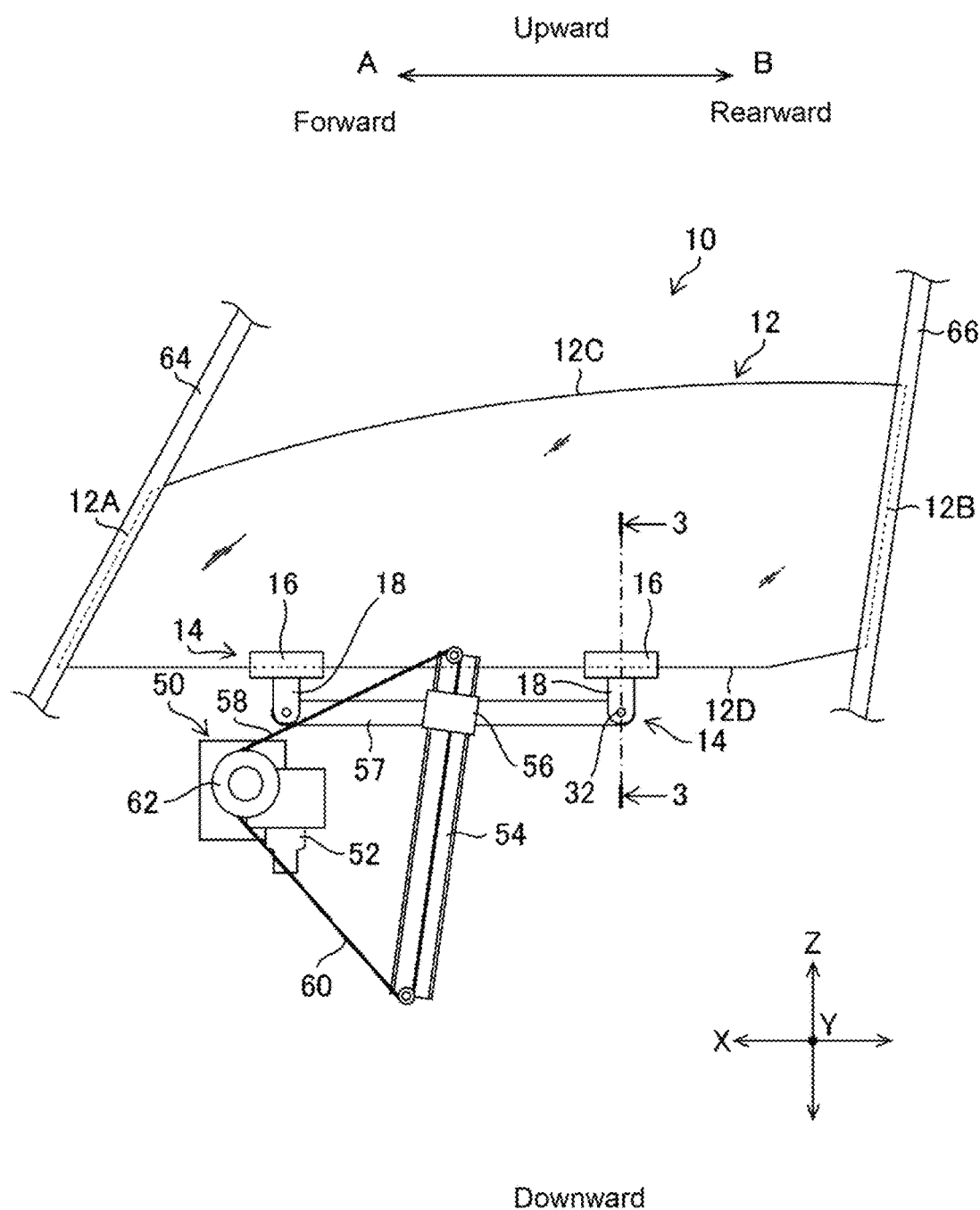
FIG. 2 is a front view of a structure of the vehicle window glass with a clamping member shown in FIG. 1.

FIG. 1 shows an example where the vehicle window glass with a clamping member 10 according to this embodiment (hereinbelow, referred to as "the vehicle window glass 10" for short) is mounted to a vehicle 200. FIG. 2 is a front view of a structure of the vehicle window glass 10 shown in FIG. 1. In FIGS. 1 and 2, a forward direction and a rearward direction of the vehicle 200 are indicated by an arrow A and an arrow B, respectively. In Description, explanation will be made using a three-dimensional coordinate system having X, Y and Z axes perpendicular to one another. The Z axial direction is an upward and downward direction of the vehicle 200 and corresponds to a first direction. The Y axial direction is a vehicle width direction of the vehicle 200 (depth direction in the sheets of FIGS. 1 and 2) and corresponds to a second direction. The X axial direction is a forward and rearward direction of the vehicle 200 indicated by the arrows A and B, and corresponds to a third direction.

As one example, the vehicle window glass 10 shown in FIG. 1 is applied to a front sidelite and is assembled to a front side door 202 of the vehicle 200. The vehicle window glass 10 is coupled to a lifting device 50 installed in the door panel 204 of the front side door 202 (see FIG. 2) and is moved up and down by a driving force from the lifting device 50 to open and close the window opening 206 of the front side door 202.

The lifting device 50 shown in FIG. 2 includes an electric motor 52, a guide rail 54, a slider 56, a first wire 58, a second wire 60, and a drum 62. The front side door 202 (see FIG. 1) includes a front sash 64 and a rear sash 66, which guide the lifting movement of the vehicle window glass 10 in cooperation with the lifting device 50.

The guide rail 54 is disposed in the door panel 204 so as to have a longitudinal direction extending along a sliding movement direction of the vehicle window glass 10. The slider 56 is a member to be coupled to the vehicle window glass 10 and is engaged with guide rail 54 so as to be slidable along the longitudinal direction (upward and downward directions) of the guide rail 54. The first wire 58 has a first end coupled to the drum 62 and the second end coupled to the slider 56. The second wire 60 has a first end coupled to the drum 62 and a second end coupled to the slider 56. The front sash 64 supports a forward edge portion 12A of a laminated glass 12 forming the vehicle window glass 10 while the rear sash 66 supports a rearward edge portion 12B of the laminated glass 12 so as to make the rear edge portion slidable.

In accordance with the lifting device 50, when the drum 62 is rotated in one direction by the electric motor 52 in the lifting device 50, the first wire 58 is wound on the drum 62 while the second wire 60 is fed out from the drum 62. Thus, the slider 56 is moved up along the guide rail 54 such that the vehicle window glass 10 is moved up, being guided by the front sash 64 and the rear sash 66.

In contrast, when the drum 62 is rotated in the opposite direction by the electric motor 52, the first wire 58 is fed out from the drum 62 while the second wire 60 is wound on the drum 62. Thus, the slider 56 is moved down along the guide rail 54 such that the vehicle window glass 10 is moved down, being guided by the front sash 64 and the rear sash 66.

Figure 3:
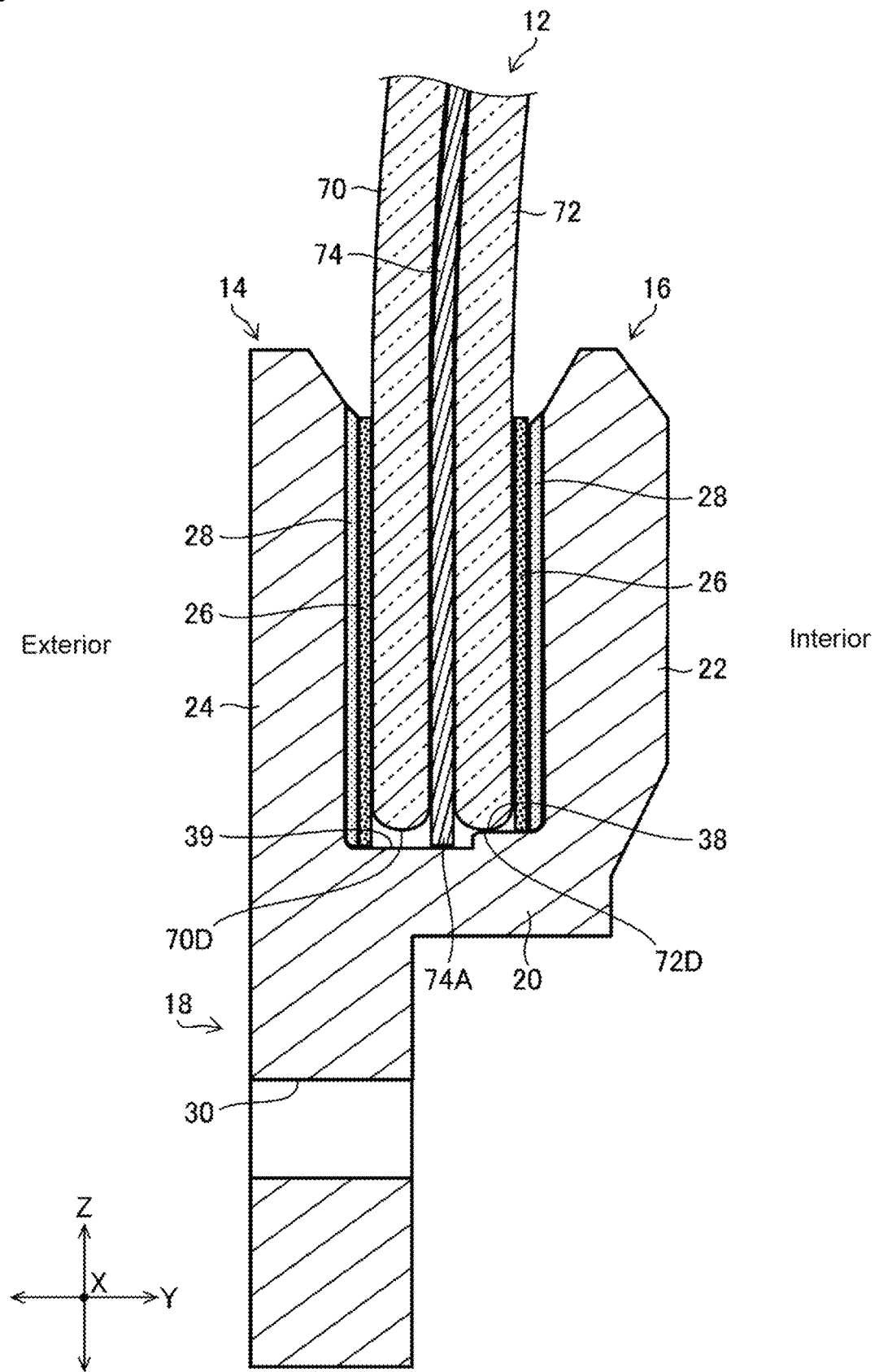
FIG. 3 is a cross-sectional view of the vehicle window glass with a clamping member taking along line 3-3 of FIG. 2.

FIG. 3 is a cross-sectional view of the vehicle window glass 10, taken along line 3-3 in FIG. 2. In other words, FIG. 3 is a cross-sectional view of the vehicle window glass 10, which is shown when the vehicle 200 is seen from its rearward side toward its forward side.

In this embodiment, the laminated glass 12 forming the vehicle window glass 10 is a laminated glass which includes two non-tempered glass plates 70 and 72 bonded together via an interlayer 74. Each of the non-tempered glass plates 70 and 72 may be prepared by forming molten glass in a plate shape and annealing the formed molten glass, and has a lower allowable stress than tempered glass which has a compressive stress layer formed in the glass surface. In the laminated glass 12 according to this embodiment, the glass plate 70 and the glass plate 72 are positioned on an exterior side and on an interior side of the vehicle 200, respectively, when the vehicle window glass 10 is mounted to the vehicle 200.

Glass Plate

Each of the glass plates 70 and 72 may be made of inorganic glass, such as soda-lime glass, aluminosilicate glass, borosilicate glass, alkali-free glass or quartz glass. Among them, soda-lime glass is particularly preferable in terms of production cost and moldability. Although there is no particular limitation to how to form the glass plates 70 and 72, it is preferable to use a float process. Each of the glass plates 70 and 72 may be a glass plate which absorbs a ultraviolet ray or infrared ray. Although each of the glass plates 70 and 72 is preferably transparent, each of the glass plates may be a colored glass plate, which is colored to such an extent not to impair the transparency.

The laminated glass 12 is formed in a substantially trapezoidal form in a front view (see FIG. 2) and has a peripheral edge portion formed by a front edge portion 12A, a rear edge portion 12B, an upper edge portion 12C and a lower edge portion 12D. The laminated glass 12 is formed in a curved shape so as to have a cross-section shape projecting in an exterior direction of the vehicle 200 in the three-dimension coordinate system having the X, Y and Z axes, i.e., in a complex shape curving in the X and Y axial directions when the laminated glass is mounted to the vehicle 200 (see FIG. 1). The laminated glass 12 has a radius of curvature of preferably at least 1,000 mm and at most 100,000 mm. The glass plate 70 and the glass plate 72 may have the same radius of curvature or different radiuses of curvature. The laminated glass 12 may be formed in a single curved shape curving only in the X axial direction or the Y axial direction. The laminated glass 12 may be bent by, e.g., gravity bending, press bending or roller bending.

The glass plate 70, which is an exterior side glass plate of the laminated glass 12, has a thickness of preferably at least 1 mm and at most 3 mm. When the thickness of the glass plate 70 is at least 1 mm, it is possible to obtain a sufficient strength in terms of resistance against a flipped stone or the like. When the thickness is at most 3 mm, the laminated glass 12 is prevented from being excessively heavy, which is preferable in terms of fuel consumption of the vehicle 200. The thickness of the glass plate 70 is more preferably at least 1.3 mm and at most 2.8 mm, furthermore preferably at least 1.4 mm and at most 2.6 mm.

The glass plate 72, which is an interior side glass plate of the laminated glass 12, has a thickness of preferably at least 0.3 mm and at most 2.3 mm. When the thickness of the glass plate 72 is at least 0.3 mm, the laminated glass can have an excellent handling performance. When the thickness is at most 2.3 mm, the laminated glass is prevented from being excessively heavy.

The glass plates 70 and 72 may have the same thickness or different thicknesses. When the glass plates 70 and 72 have the same thickness, each of the glass plates 70 and 72 may have a thickness of at least 1.0 mm and at most 1.6 mm such that the laminated glass 12 can achieve both weight reduction and sound insulation.

The interlayer 74 of the laminated glass 12 may be, for example, an interlayer made of polyvinyl butyral (PVB), or an interlayer made of ethylene vinyl acetate copolymer (EVA), which is preferable in particular when water resistance is required. An acrylic photopolymerizable prepolymer, an acrylic catalyst-polymerizable prepolymer, a photopolymerizable prepolymer of acrylate ester and vinyl acetate, or polyvinyl chloride is also applicable to the interlayer 74. The interlayer 74 may have a single layer structure or a plural layer structure. The interlayer 74 may be transparent or colored.

The number of the glass plates 70 and 72 forming the laminated glass is not limited to two as in this embodiment and may be at least three. At least two interlayers 74 may be used when bonding at least three glass plates.

Clamping Member

As shown in FIGS. 2 and 3, the lower edge portion 12D of the laminated glass 12 has paired clamping members 14 and 14 disposed at positions thereof so as to be spaced in the X axial direction along the lower edge portion 12D (third direction).

Figure 4:
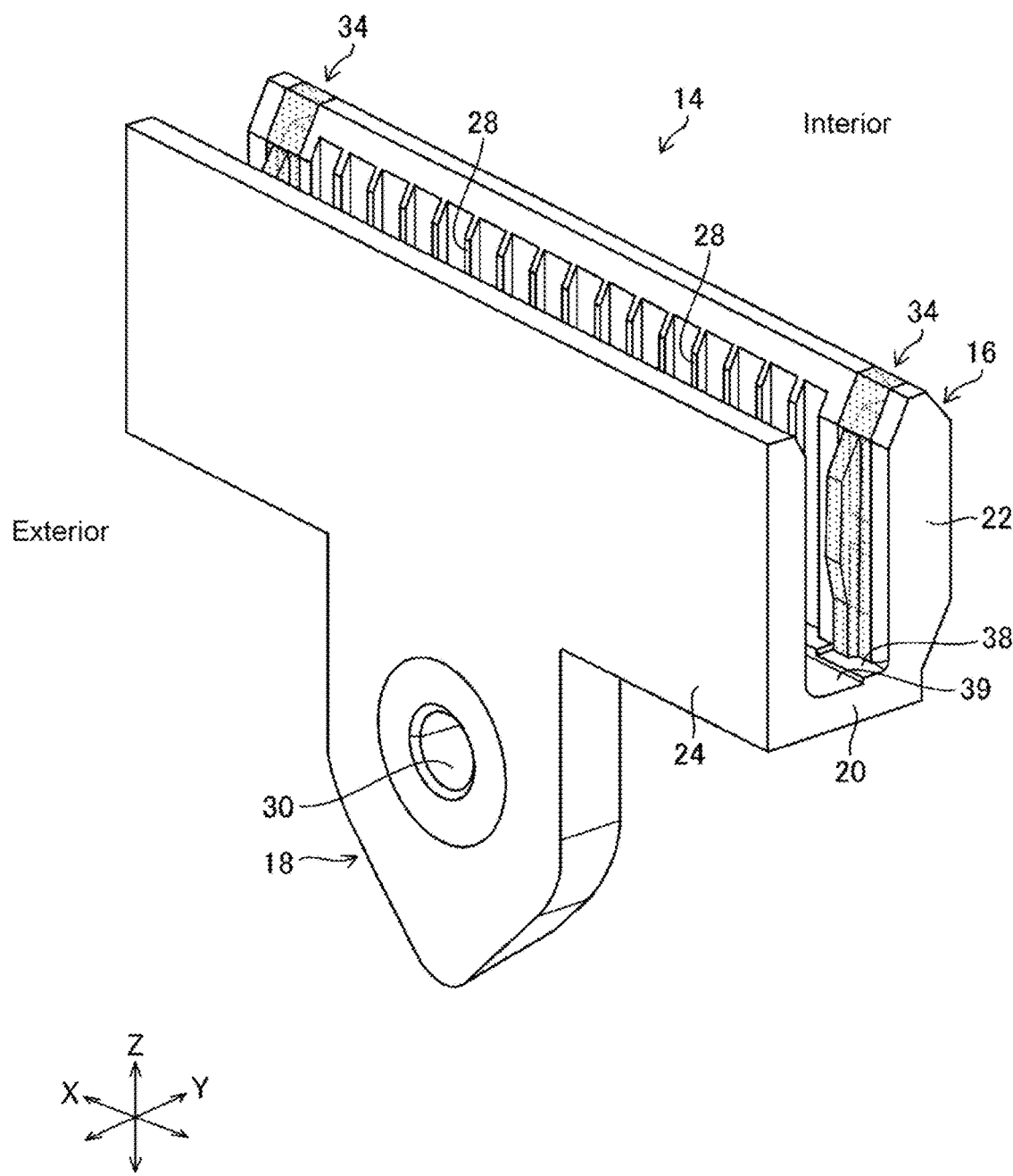
FIG. 4 is an enlarged perspective view of a clamping member shown in FIG. 2.
Figure 5:
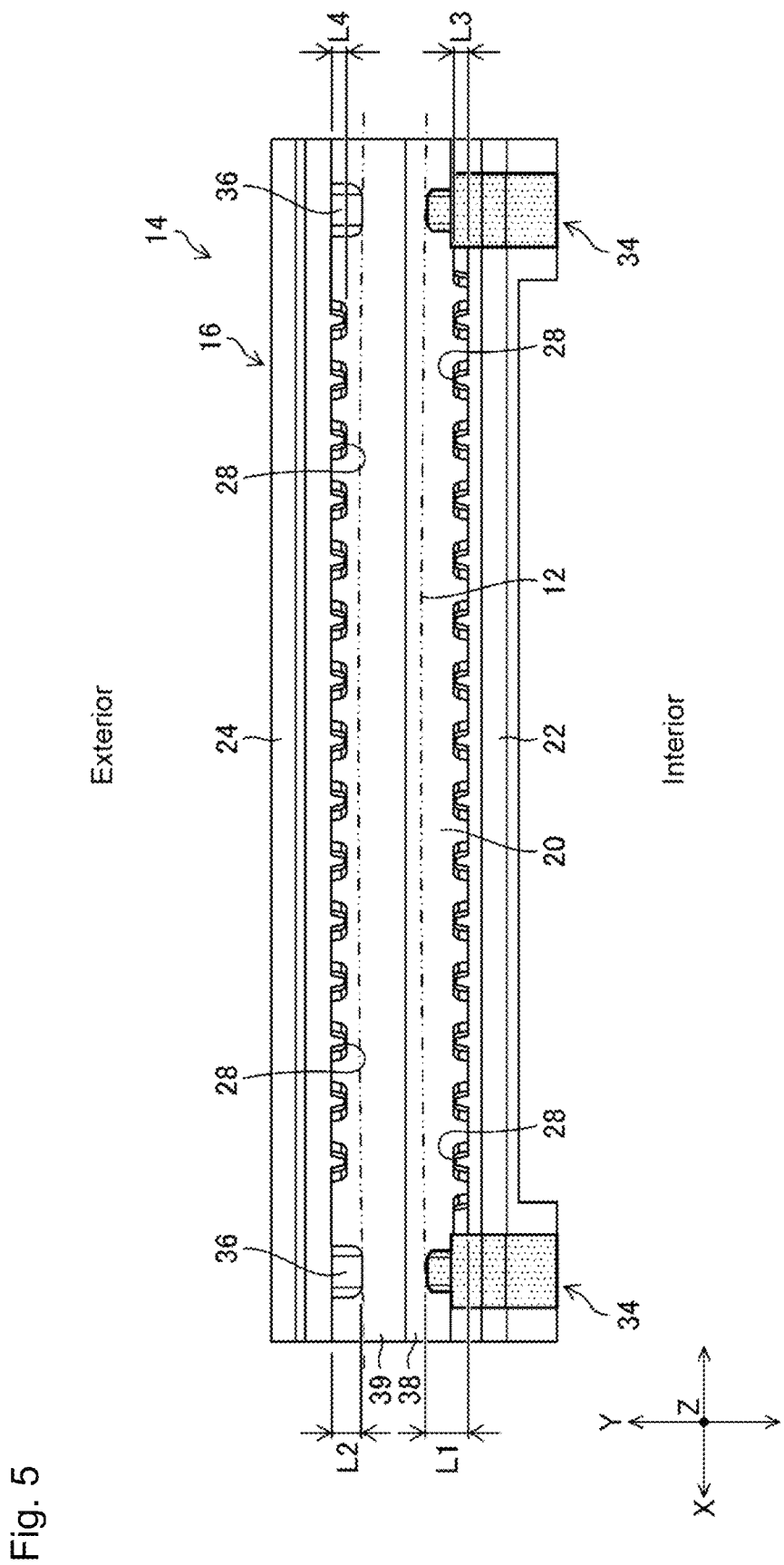
FIG. 5 is a top plan view of the clamping member shown in FIG. 4.

FIG. 4 is an enlarged perspective view of a clamping member 14. FIG. 5 is a top plan view of the clamping member 14. As shown in FIGS. 4 and 5, each of the clamping members 14 includes a body portion 16 and a coupling portion 18.

Body Portion

The body portion 16 is formed in a substantially U-shape in section and is attached to the lower edge portion 12D of the laminated glass 12 as shown in FIG. 3. Specifically, the body portion 16 includes a bottom portion 20, a first side wall portion 22 and a second side wall portion 24.

The bottom portion 20 is formed in a substantially rectangular shape in section along the Z axial direction (first direction) and in a block shape having a longitudinal axis in the X axial direction (third direction). The first side wall portion 22 extends from the bottom portion 20 in the Z axial direction perpendicular to the bottom portion 20 and is formed in a substantially rectangular shape in section along the Z axial direction. The second side wall portion 24 is spaced from the first side wall portion in the Y axial direction (second direction) perpendicular to the Z axial direction and extends from the bottom portion 20 in the Z axial direction so as to be opposite to the first side wall portion 22. Although it is shown in FIG. 3 that the second side wall portion 24 has a sectional shape in the Z axial direction formed in a substantially rectangular shape having a smaller thickness than the first side wall portion 22, the sectional shape of the second side wall portion 24 in the Z axial direction is not limited to the shown one. The first side wall portion 22 and the second side wall portion 24 may have the same thickness in section in the Z axial direction, or the first side wall portion 22 is thicker than the second side wall portion 24 in section in the Z axial direction. In the body portion 16 thus configured, the lower edge portion 12D of the laminated glass 12 is accommodated in an accommodating portion for attachment defined by the bottom portion 20, the first side wall portion 22 and the second side wall portion 24, and is fixed to the lower edge portion 12D by an adhesive 26 filled in the accommodating portion in advance or afterward.

Each of the first side wall portion 22 and the second side wall portion 24 has a plurality of ribs 28 disposed on an inner lateral surface facing the inner lateral surface of the counterpart. Each of the ribs 28 is formed in a thin plate shape having a longitudinal axis in the Z axial direction such that adjacent ribs are spaced apart in the X axial direction. Because the presence of the ribs 28 forms flow passages, the adhesive 26 can easily flow in the Y direction such that the adhesive is apt to be interposed between the entire surfaces of the glass plates in the accommodating portion. The presence of the ribs 28 is helpful to reinforce the strength of the first side wall portion 22 and the second side wall portion 24.

Coupling Portion

The coupling portion 18 is formed with the body portion 16 as one unit and extends from a lower portion of the second side wall portion 24 downwards in the Z axial direction, for example. The coupling portion 18 has a coupling hole 30 formed therein such that a bolt 32 shown in FIG. 2, which is to be inserted into the coupling hole 30, can be fastened to an arm 57 of the slider 56 to couple the relative clamping member 14 to the slider 56.

Each of the body portion 16 and the coupling portion 18 shown in FIGS. 3 and 4 may be, for example, made of a rigid engineering plastics such as a polybutylene terephthalate resin (PBT) or a polyacetal resin (POM). Each of the body portion 16 and the coupling portion 18 is not limited to be made of a resin and may be made of a metal. It should be noted that each of the body portion 16 and the coupling portion 18 is preferably made of a resin when first soft convex members 34, which will be described later, are attached to the first side wall portion 22 by two-color forming.

First Convex Member

As shown in FIG. 4, the first convex members 34 are attached to the first side wall portion 22 of each of the clamping members. Each of the first convex members 34 is configured to project toward the second side wall portion 24 and is made of a softer material than the first side wall portion 22. As shown in FIG. 5, the first convex members 34 are disposed at positions of the first side wall portion 22 adjacent respective ends of the first side wall portion in the X axial direction (third direction) perpendicular to the Z axial direction (first direction) and the Y axial direction (second direction). Each of the first convex members 34 is formed to extend in the Z axial direction.

The first convex members 34 and 34 thus disposed are brought into elastic contact with an interior side surface of the laminated glass 12 in a curved shape as shown in FIG. 5 when each of the clamping member 14 is attached to the lower edge portion 12D of the laminated glass 12.

The first convex members 34 may contain, as one example, a thermoplastic elastomer-based resin, such as ethylene propylenediene rubber (EPDM), silicone rubber, an olefin-based thermoplastic elastomer (TPO), an ABS resin, a polyethylene resin (PE) or a polypropylene resin (PP). Since the first convex members 34 contain a thermoplastic elastomer-based resin as a component, the first convex members 34 are pressed against the interior side surface of the laminated glass 12, being elastically deformed. By this arrangement, the residual stress caused in the clamping members 14 (in particular, the body portions 16) can be reduced, and the residual stress caused in the laminated glass 12 can be also reduced. Because the thermoplastic elastomer-based resin is apt to be roughened, the surface of the first convex members 34 in contact with the interior side surface of the laminated glass 12 can be roughened to increase the friction resistance caused between the first convex members 34 and the interior side surface of the laminated glass 12. Thus, it is possible to fix the laminated glass 12 and the clamping members 14 more firmly.

<Second Convex Member>

As shown in FIG. 5, the second side wall portion 24 of each of the clamping members 14 includes second convex members 36. The respective second convex members 36 are disposed, being opposite to the respective first convex members 34 in the Y axial direction (second direction) to clamp the laminated glass 12 between the first convex members 34 and the second convex members 36.

The second convex members 36 are formed with the second side wall portion 24 as one unit and are configured to extend in the Z axial direction as in the first convex members 34. Each of the second convex members 36 has a thickness set to be substantially equal to the width of the first convex members 34 in the X axial direction.

Each of the first convex members 34 and each of the second convex members 36 have a projection length L1 from the first side wall portion 22 in the Y axial direction and a projection length L2 from the second side wall portion 24 in the Y axial direction set to be longer than the projection length L3 of the ribs 28 from the first side wall portion 22 and the projection length L4 of the ribs 28 from the second side wall portion 24, respectively. Since the projection lengths L1 to L4 are thus set, the laminated glass 12 can be clamped by the first convex members 34 and the second convex members 36 disposed at the positions of the clamping members 14 adjacent the respective ends in the X axial direction without being brought into contact with the ribs 28 even when the laminated glass is formed in a curved shape. Thus, it is possible to avoid the occurrence of a residual stress in the clamping members 14 and the laminated glass 12 caused by contact of the laminated glass 12 with the ribs 28. Although the second convex members 36 are not members essential to the vehicle window glass 10, it is further possible to reduce the residual stress caused in the clamping members 14 and the laminated glass 12 when the second side wall portions 24 include the second convex members 36 as well.

Stepped Portion

As shown in FIGS. 3 to 5, the bottom portion 20 of each of the clamping members 14 has a stepped portion 38 formed at a position corresponding to a lower edge portion 72D of the glass plate 72 of the laminated glass 12. The stepped portion 38 is formed to extend the X axial direction (third direction) such that the lower edge portion 72D of the glass plate 72 is placed thereon. By this arrangement, when the interlayer 74 has a lower edge portion 74A extending outside the lower edge portion 72D of the glass plate 72 as shown in FIG. 3, the lower edge portion 74A is received in a channel portion 39 adjacent to the stepped portion 38. The stepped portion 38 may have a height set based on an estimated projection length of the lower edge portion 74A of the interlayer 74. When the glass plate 70 has a lower edge portion 70D extending outside the lower edge portion 72D of the glass plate 72, the lower edge portion 70D is also received in the channel portion 39. The stepped portion 38 may be disposed at a position corresponding to the lower edge portion 70D of the glass plate 70.

As described above, in the vehicle window glass 10 according to this embodiment, the first side wall portion 22 of each of the clamping members 14 includes the first convex members 34 projecting toward the second side wall portion 24 and being softer than the first side wall portion 22, and the first convex members 34 are disposed at the positions of the first side wall portion 22 adjacent to the respective ends of the first side wall portion in the X axial direction (third direction). Thus, it is possible to reduce the residual stresses caused in the clamping members 14 and the laminated glass 12. By this arrangement, the vehicle window glass 10 can have a high durability even when the laminated glass 12 is applied to the vehicle window glass 10.

In the vehicle window glass 10 according to this embodiment, it is possible to further decrease the residual stresses caused in the clamping members 14 and the laminated glass 12 since the second side wall portion 24 of each of the clamping members 14 has the second convex members 36 disposed therein so as to clamp the laminated glass 12 between the first convex members 34 and the second convex members 36.

In the vehicle window glass 10 according to this embodiment, it is possible to receive, in each of the channel portions 39, the lower extending edge portion 74A of the interlayer 74 or the lower extending edge portion 70D of the glass plate 70 since the bottom portion 20 of each of the clamping members 14 includes the stepped portion 38 at the position thereof corresponding to the lower edge portion 72D of the glass plate 72 of the laminated glass 12. By this arrangement, the bottom portion 20 of each of the clamping members 14 can be reliably brought into contact with the lower edge portion 12D of the laminated glass 12 to improve relative positional accuracy between the clamping members 14 and the laminated glass 12. In other words, when the stepped portions 38 are absent, the lower extending edge portion 74A of the interlayer 74 or the lower extending edge portion 70D of the glass plate 70 is brought into contact with the bottom portion 20 of each of the clamping members to cause the clamping members 14 to be attached to the laminated glass 12, being inclined to the laminated glass 12, which causes a problem peculiar to the laminated glass in that the above-mentioned positional accuracy decreases. This problem can be solved by the presence of the stepped portion 38 on the bottom portion 20 of each of the clamping members.

Figure 6:
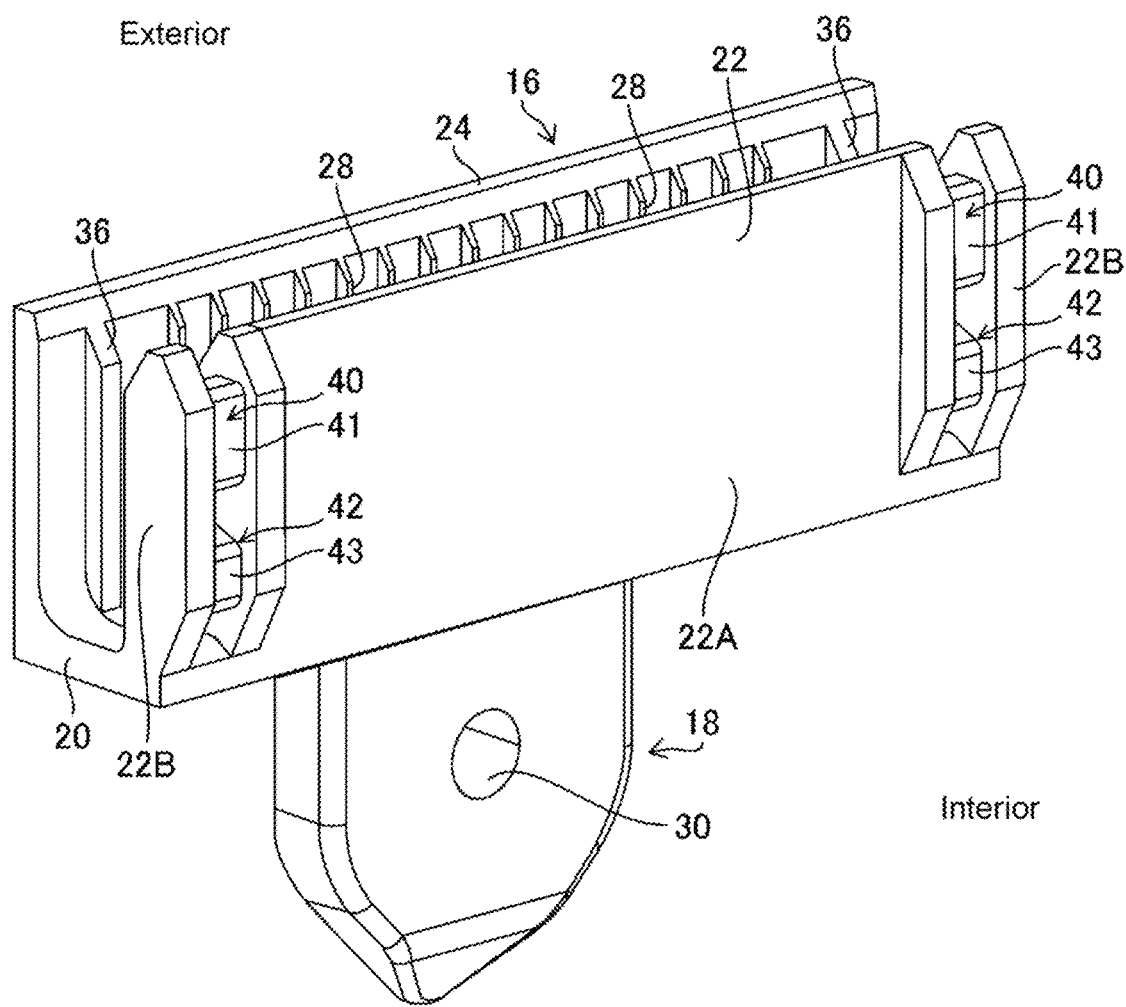
FIG. 6 is a perspective view of the clamping member with first convex members being removed.
Figure 7:
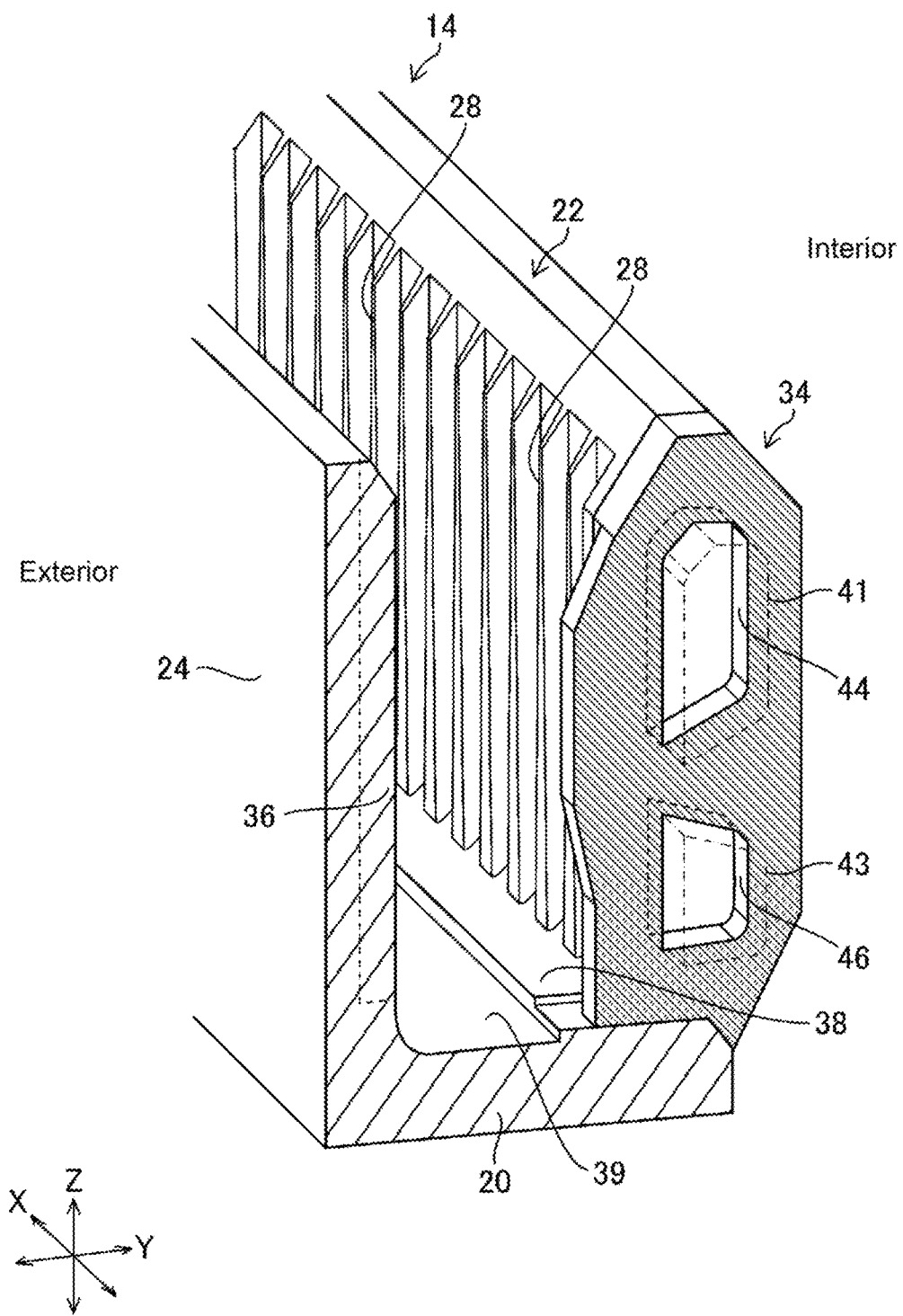
FIG. 7 is a schematic view of a structure for attaching a first convex member to a first side wall.

Now, explanation will be briefly made about a procedure where the first convex members 34 are attached to the first side wall portion 22 of the each of the clamping members by two-color molding. FIG. 6 is a perspective view illustrating the appearance of a clamping member 14 with the first convex members 34 are removed. FIG. 7 is a schematic view illustrating a structure for attaching the first convex members 34 to a first side wall portion 22.

First, the clamping members 14 are produced as primary molded products except for the first convex members 34. Specifically, a primary mold is fabricated so as to have a cavity for producing a clamping member 14 except for the first convex members 34, and a molten resin of engineering plastics is injected into the cavity of the primary mold. The clamping member 14 shown in FIG. 6 can be produced in this way.

The first side wall portion 22 of the clamping member 14 shown in FIG. 6 includes a first fixing portion 40 and a second fixing portion 42 for fixing each of paired first convex members 34 (see FIG. 7). The first fixing portion 40 and the second fixing portion 42 are disposed so as to be spaced apart from each other in the Z axial direction (first direction).

Specifically, each of the first fixing portions 40 is formed as a first projection portion 41 disposed on the corresponding first wall portion 22 along the third direction, and each of the second fixing portions 42 is disposed on the corresponding first wall portion 22 along the third direction so as to serve as a second projection portion 43 spaced apart from the first projection portion 41 in the first direction. The first projection portions 41 and the second projection portions 43 are formed so as to connect between a main wall portion 22A of the first side wall portion 22 and sub-wall portions 22B disposed at both ends of the first side wall portion 22 in the X axial direction.

Next, the first convex members 34 as second molded products are molded to each of the respective clamping members 14 as the first molded products. Specifically, a secondary mold is fabricated so as to have cavities for producing the first convex members 34, and the secondary mold is attached to a first side wall portion 22 so as to cover the first fixing portions 40 and the second fixing portions 42. A molten resin containing a thermoplastic elastomer-based resin is injected into the cavities of the secondary mold. Thus, the first convex member 34 shown in FIG. 7 is formed on the first side wall portion 22.

Each of the first convex members 34 thus formed has a first opening portion 44 formed therein so as to be engaged with the corresponding first projection portion 41 since the molten resin is injected around the periphery of the first projection portion 41. Likewise, each of the first convex members 34 has a second opening portion 46 formed therein so as to be engaged with the corresponding second projection portion 43 since the molten resin is injected around the periphery of the second projection portion 43. Thus, each of the first convex members 34 is formed in an 8-character shape as seen from the X axial direction (third direction) as shown in FIG. 7. It should be noted that the shape of the first convex portions 34 is not limited to an 8-character shape and is preferably a shape like a ladder.

Figure 8:
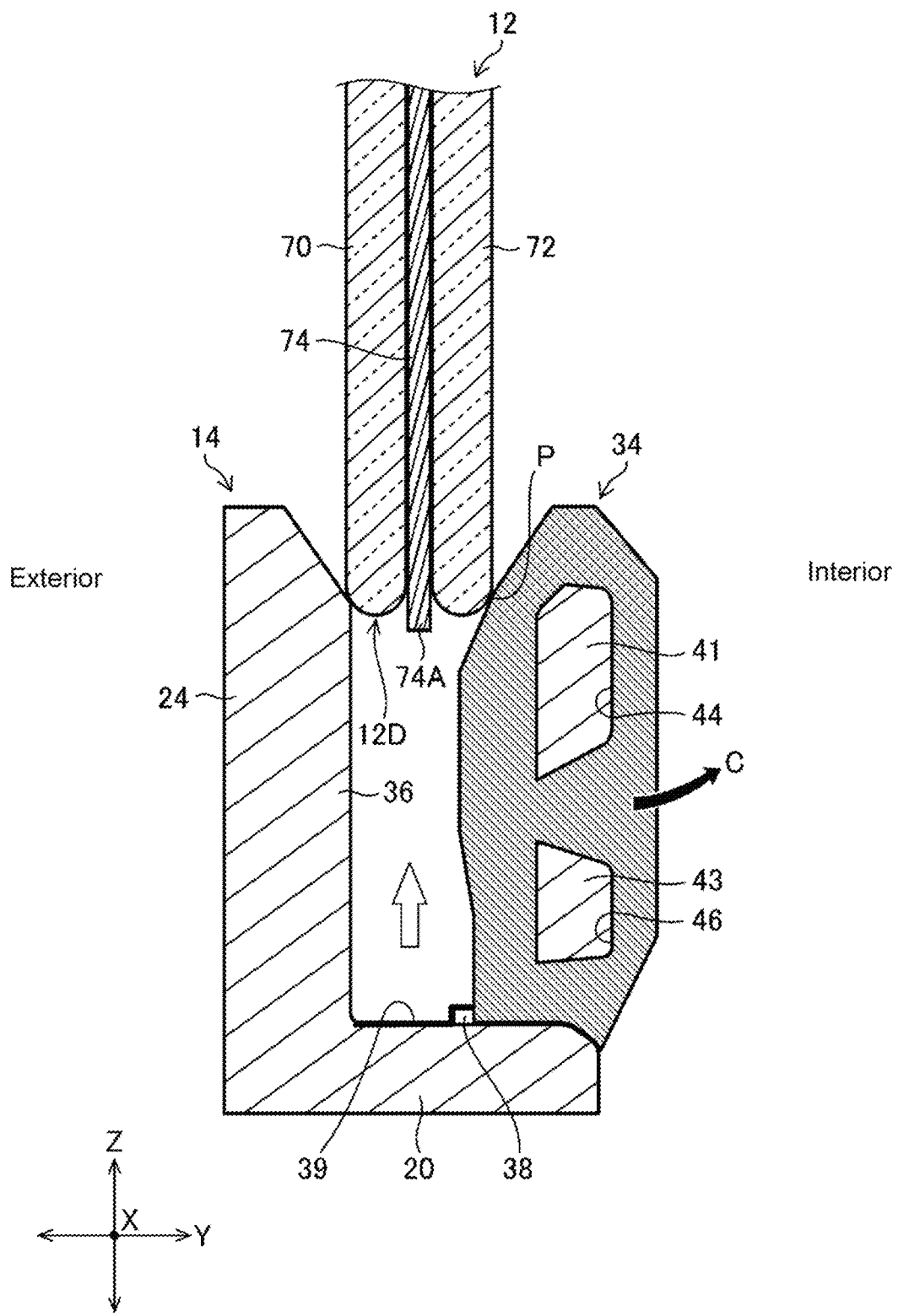
FIG. 8 is a schematic view illustrating in what state the first convex member is when the clamping member is attached to a laminated glass.

FIG. 8 is a schematic view illustrating in what state a first convex member 34 is when a clamping member 14 is attached to the lower edge portion of the laminated glass 12.

Figure 9:
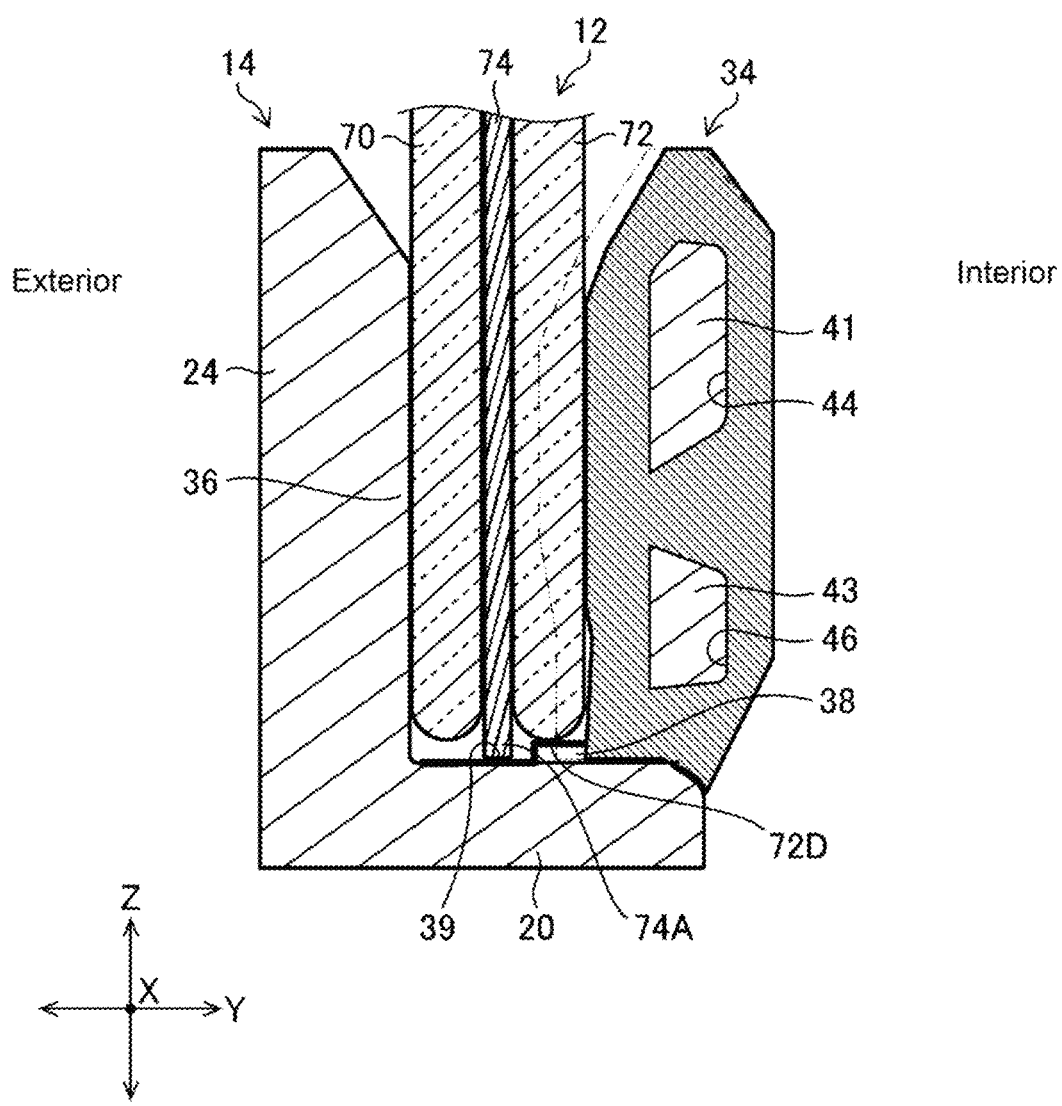
FIG. 9 is a schematic view illustrating in what state the first convex member is when the clamping member has been attached to the laminated glass.

When an attempt is made to attach the clamping member 14 to the lower edge portion 12D of the laminated glass 12 as shown in FIG. 8, a frictional resistance is generated between the first convex member 34 and the laminated glass 12 to apply a rotational force to the first convex member 34 so as to rotate the first convex member 34 about a contact point P between the first convex member 34 and the laminated glass 12. At this stage, the first opening portion 44 and the second opening portion 46 of the first convex member 34 are, respectively, engaged with the first projection portion 41 and the second projection portion 43 of the first side wall portion 22 spaced apart each other in the Z axial direction. By this arrangement, the first convex member 34 is kept in an initial position to be attached to the first side wall portion 22 even when the rotational force is applied to the first convex member 34. It results in that when the clamping member 14 has been attached to the lower edge portion 12D of the laminated glass 12, the first convex member 34 is elastically deformed by the laminated glass 12 and is brought into close contact with the interior side of the laminated glass 12 as shown in FIG. 9. Thus, it is possible to effectively reduce the residual stress generated in the clamping member 14 and the laminated glass 12.

Although explanation of the embodiment has been made about a case where the clamping members 14 are molded by two-color molding, the production is not limited to the two-color molding. For example, the first convex members 34 may be bonded to or engaged with a first side wall portion after separate molding of the first convex members 34 and the first side wall portion, realizing the clamping members 14.

Although the embodiment has been described, the present invention is not limited to the described embodiment. Various improvements and modifications can be made without departing the spirit of the invention.

The entire disclosure of Japanese Patent Application No. 2020-206525 filed on Dec. 14, 2020 including specification, claims, drawings and summary is incorporated herein by reference in its entirety.

What is claimed is:

1. A vehicle window glass with a clamping member, which is configured to attached to a vehicle door so as to be slidable up and down, comprising:
   a laminated glass, the laminated glass comprising an exterior side glass plate and an interior side glass plate, and the exterior side glass plate and the interior side glass plate being bonded via an interlayer; and
   a clamping member, the clamping member attached to a lower side of the laminated glass and holding an edge portion of the laminated glass;
   wherein the clamping member comprises:
   a bottom portion;
   a first side wall portion, the first side wall portion extending from the bottom portion in a first direction perpendicular to the bottom portion;
   a second side wall portion, the second side wall portion being spaced from the first side wall in a second direction perpendicular to the first direction, the second side wall portion extending from the bottom portion in the first direction and being opposite to the first side wall portion;
   wherein the first wall portion includes first convex members projecting toward the second side wall portion, the first convex members being softer than the first side wall portion; and
   wherein the first convex members are disposed at positions of the first side wall portion adjacent to respective ends of the first side wall portion in a third direction perpendicular to the first direction and the second direction.

2. The vehicle window glass according to claim 1, wherein the second side wall portion includes second convex portions, the second convex portions being disposed at positions opposite to the first convex members in the second direction so as to clamp the laminated glass between the first convex portions and the second convex portions.

3. The vehicle window glass according to claim 1, wherein the bottom portion includes a stepped portion at a position corresponding to a lower edge portion of the exterior side glass plate or the interior side glass plate of the laminated glass, the stepped portion being formed to extend in the third direction.

4. The vehicle window glass according to claim 1, wherein the first convex members extend in the first direction.

5. The vehicle window glass according to claim 1, wherein the first side wall portion includes at least one pair of a first fixing portion and a second fixing portion, the first fixing portion and the second fixing portion being spaced apart each other in the first direction for fixing each of the first convex members to the first side wall portion.

6. The vehicle window glass according to claim 5, wherein the first fixing portion comprises a first projection portion formed on the first side wall portion along the third direction;

the second fixing portion comprises a second projection portion formed on the first side wall portion along the third direction and disposed so as to be spaced apart from the first projection portion in the first direction; and each of the first convex members includes a first opening portion engageable with the corresponding first projection portion and a second opening portion engageable with the corresponding second projection portion.

7. The vehicle window glass according to claim 1, wherein the first convex members contain a thermoplastic elastomer-based resin.

\* \* \* \* \*